Nov. 1, 1966  P. H. HARTEL  3,282,128
MECHANICAL COUPLING ARRANGEMENT
Filed Feb. 17, 1965  4 Sheets-Sheet 1

Inventor:
Pieter Hendrik Hartel
By Baldwin & Wight
Attorneys

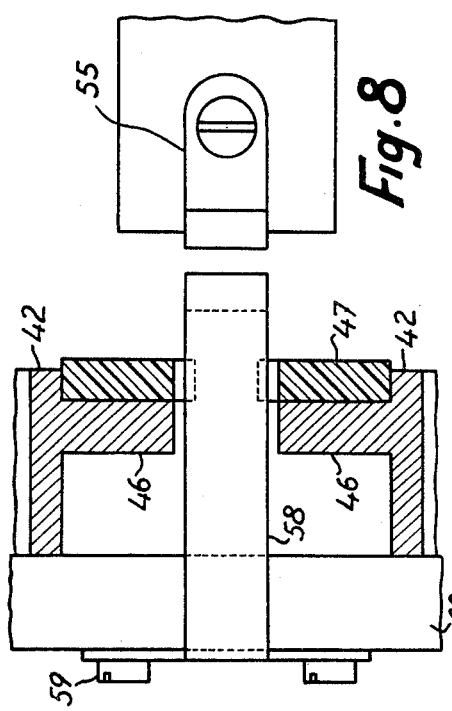
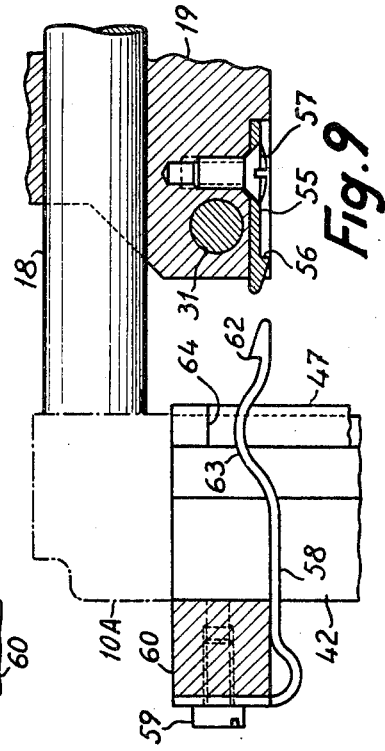
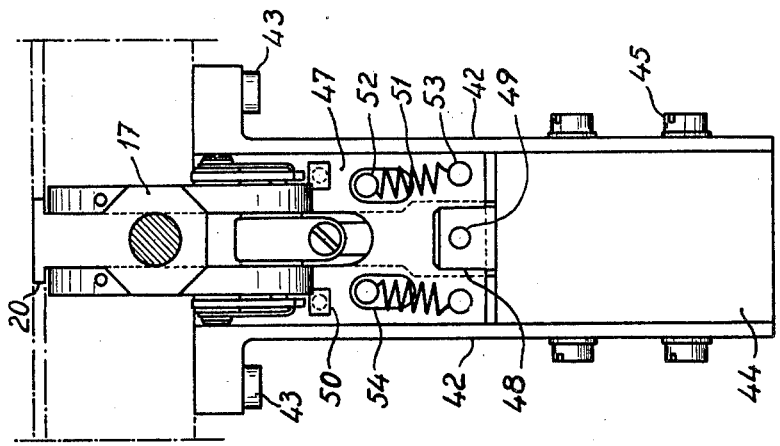

Inventor:
Pieter Hendrik Hartel
BY Baldwin & Wight
Attorneys

Nov. 1, 1966    P. H. HARTEL    3,282,128
MECHANICAL COUPLING ARRANGEMENT
Filed Feb. 17, 1965    4 Sheets-Sheet 4
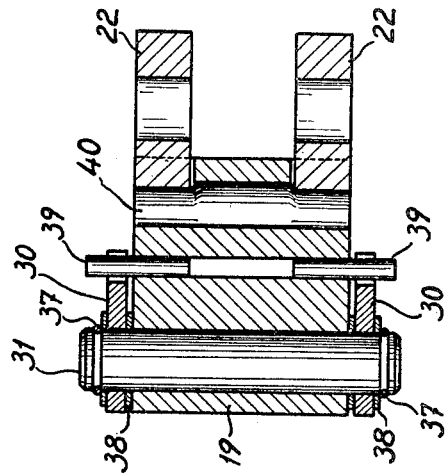
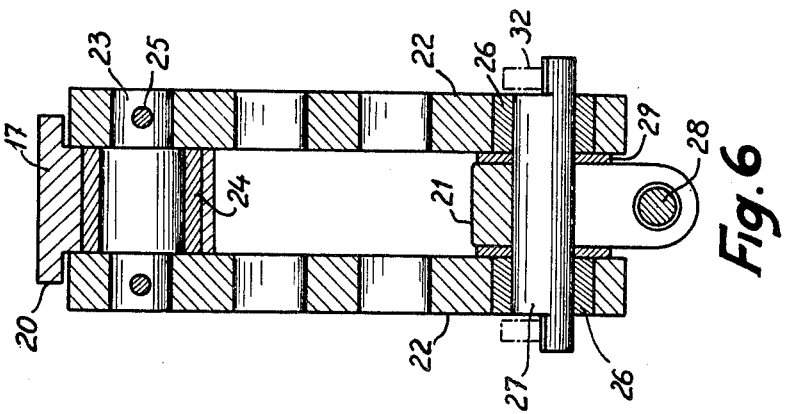
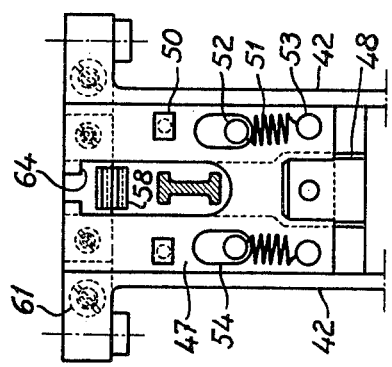
Inventor:
Pieter Hendrik Hartel
BY Baldwin & Wight
Attorneys

United States Patent Office 3,282,128
Patented Nov. 1, 1966

3,282,128
MECHANICAL COUPLING ARRANGEMENT
Pieter Hendrik Hartel, Amsterdam Oost, Netherlands, assignor to Bull Nederland (Administratie-en Statistiekmachine MIJ., N.V.), Amsterdam, Netherlands
Filed Feb. 17, 1965, Ser. No. 433,287
Claims priority, application France, Mar. 5, 1964, 966,152, Patent 1,395,758
8 Claims. (Cl. 74—593)

The invention relates to a driving mechanism having a reciprocating movement and has for its particular object to effect when required the coupling (and decoupling) of a member to be driven and of a driving member constantly actuated with a rapid reciprocating movement.

The driving mechanism in question may find applications in various fields, but its particular application is envisaged in a record card feed mechanism which may be employed, for example, in machines such as high-speed sorting machines and collating machines. In particular, the invention is applicable to a card feed mechanism, described in the applicant's copending United States patent application Serial Number 432,650, filed February 15, 1965 by the same assignee.

In the machines in question, in order to start and stop the extraction of the cards one-by-one from a supply magazine, there were initially employed various electromagnetic or electromechanical clutches for controlling the actuation of the picker knife, generally by means of a number of intermediate members. When a feed mechanism is designed to operate at an increased speed, difficulties are encountered in starting and stopping the picker knife rapidly and precisely.

The various devices or means hitherto proposed have not been entirely satisfactory and therefore a first object of the invention is to provide a driving mechanism in which the rapidity and precision are obtained by virtue of the fact that the coupling (or decoupling) of the picker knife is effected on the knife carriage plate itself.

Another object of the invention is to provide a device of this type in which the decoupling of the knife carriage is automatically brought about when it reaches a well-defined point of its reciprocating travel, i.e. in fact at the end of its travel towards a predetermined stop position.

In accordance with the invention, there is provided a mechanism comprising a driving member actuated with a reciprocating movement and a member to be driven with a rectilinear reciprocating movement in a direction determined by guide means, wherein the member to be driven, or carriage, comprises at its end a pivot pin on which are pivotally mounted two lateral levers urged by a spring, each of these levers having an arm terminated by a detent tooth, and a shorter, substantially vertical arm terminated by a bearing surface, the driving member, such as a connecting rod, comprises at one end a connecting rod pin projecting on either side, two links which are pivotally connected in their upper part to a pin secured in the carriage, and which have in their lower part a recess for the projecting portions of the said connecting rod pin, the latter being in addition arranged to be engaged by the detent teeth of the said levers when a certain positional relationship exists between the carriage and the rear end of the connecting rod, whereby the links effect the connection between the carriage plate and the said end of the connecting rod.

A slide member guided to move in a plane perpendicular to the direction of the movement of the carriage comprises two abutment studs so arranged that when the carriage is in its closest position, these studs are situated opposite to one another and in the path of the said bearing surfaces on the two levers when the slide member is situated in a first position, and the said studs are retracted when the slide member is in a second position.

Further features, and the manner in which the invention is put into practice, will be more clearly apparent from the following description, which is given by way of example, with reference to the accompanying drawings, in which:

FIGURE 2 is an end view of this mechanism;

FIGURE 5 is a sectional view along the line 1—1 of FIGURE 1;

FIGURE 6 is a sectional view along the axis of the links;

FIGURE 7 is a sectional view of the carriage along the line 2—2 of FIGURE 1, and FIGURES 8 and 9 are two fragmentary detailed views of the stop detents of the carriage.

Figure 1:
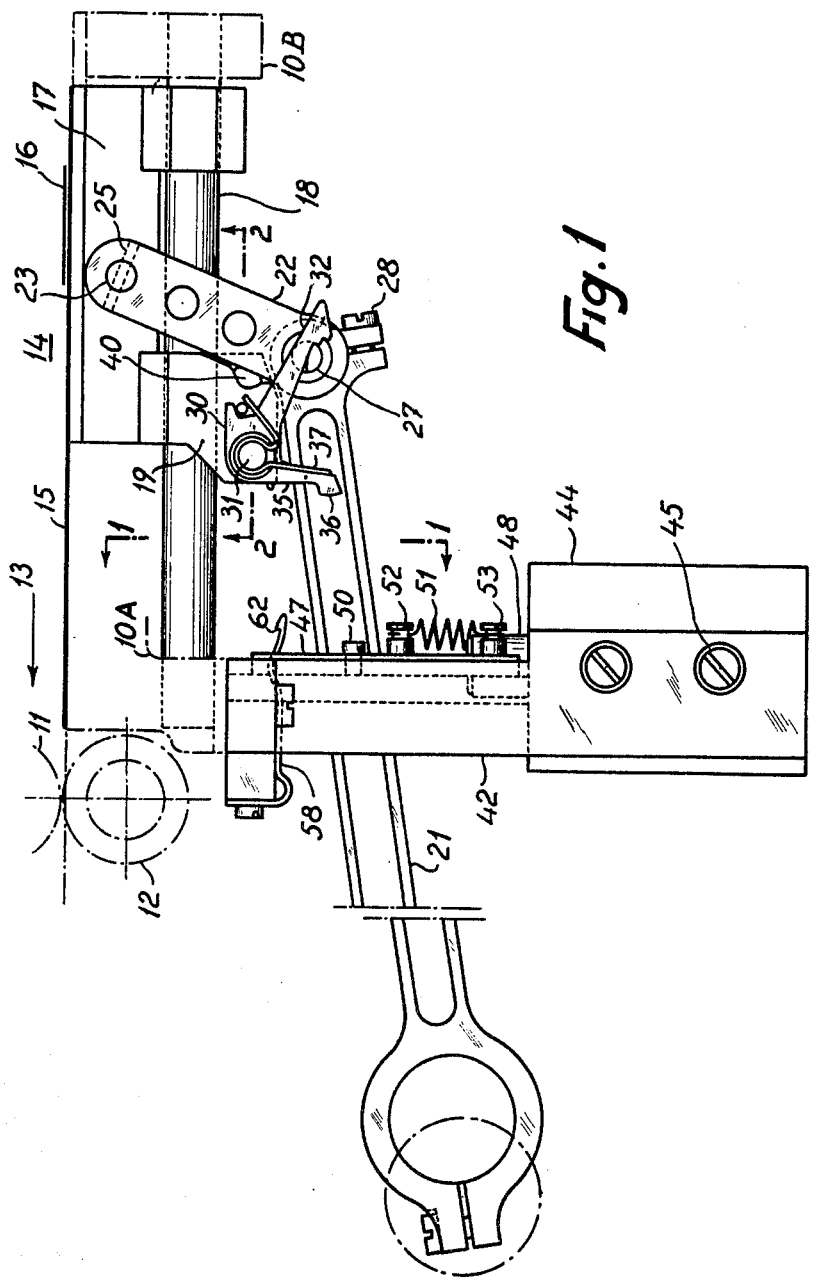
FIGURE 1 is a side view of the mechanism according to the invention.

The drawings show the application of the invention to a punched-card sorting machine. In FIGURE 1 there is shown at 10A, 10B a base plate forming the bottom of the card supply magazine, from which the cards are to be extracted one-by-one in the direction of the driving rollers 11, 12. The arrow 13 indicates the direction of advance of the cards, which will be called the forward direction. The picker carriage 14 is composed of a thin plate 15 situated between the stack of cards and the base plate, the knife 16 and the carriage block 17. The plate 15 may be, for example, screwed to the carriage block 17. The latter is formed with an axial hole to allow the passage of the cylindrical pin 18, the ends of which are secured in the flanges 10A, 10B of the base plate forming part of the frame of the machine. FIGURE 2 shows the profile given to the carriage block 17, the plate 15 not having been shown. The carriage block comprises an upper central portion, the thickness of which is slightly greater than the diameter of the pin 18, and two front and rear enlarged portions, the front enlarged portion 19 having two parallel plane faces. Two flanges 20 on the carriage block (FIGURES 2 and 6) are in addition guided in a corresponding aperture in the base plate.

The driving member, which has a continuous reciprocating movement during the operation of the machine, consists of the connecting rod 21. The head of the connecting rod 21 is assumed to be coupled to any appropriate driving member, i.e. an eccentric shaft or crankshaft, which may be actuated in known manner by the general driving system of the machine. Since the latter elements are conventional and do not form part of the invention, they have not been illustrated.

Two links 22 connect the carriage block 17 and the connecting rod 21. FIGURE 6 is a sectional view taken along the axis of the links and the rear end of the connecting rod. The pin 23 turns in a ring 24 of self-lubricating material fitted in the carriage block 17. The pin 23 is formed with two shoulders, so that the ends of smaller diameter are engaged in the upper hole in each link. The assembly comprising the two links 22 and the pin 23 forms a unit after pin-jointing by means of the two pins 25. On the pin 23, the length between the two shoulders is slightly greater than the thickness of the carriage block at this point, so that there is some play to permit the oscillating movement of the links with the pin 23. A ring 26 of self-lubricating material is fitted into the lower hole in each link 22. These rings receive the ends of the pin 27, which is held fast in the rear end of the connecting rod 21 by the screw 28. Two annuli 29 are provided to ensure the positioning of the rear end of the connecting rod between the two links.

Figure 3:
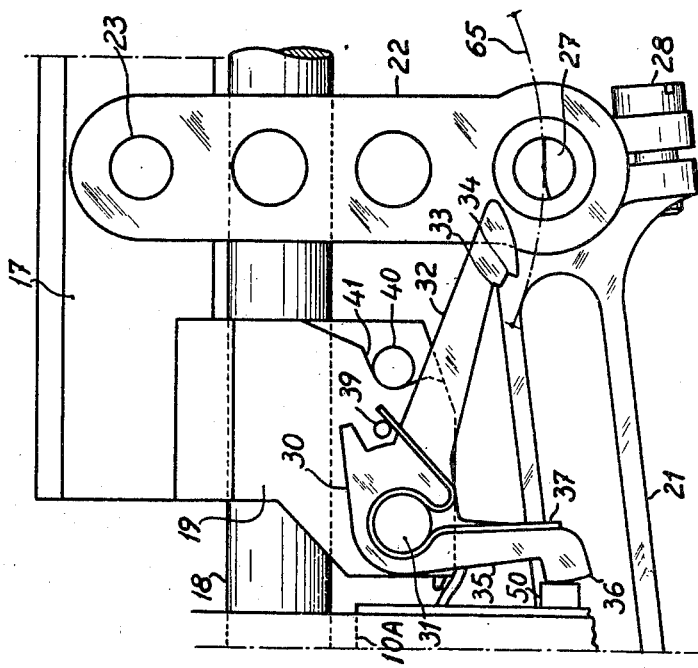

It will be seen from FIGURES 1, 3 and 7, of which the latter is a sectional view along the line 2—2 of FIGURE 1, that on either side of the enlarged portion 19 of the carriage block 17 a lever 30 is adapted to rock about the pin 31 extending through the enlarged portion 19. Each lever 30 comprises an arm 32 which is terminated by a first detent tooth 33 and a second detent tooth 34. The lever 30 comprises a second arm 35 which (see FIGURE 1) is normally in the vertical positon and is terminated by a projection bearing surface 36. It will be seen from FIGURE 7 that each end of the pin 31 is formed with a shallow circular groove to receive the steel wire spring 37. Four annuli 38 are provided to guide the levers 30. Each spring 37 has its lower end bent over to bear against the bottom of the arm 35 of the lever 30. Its other end bears against a pin 39 secured in the enlarged portion 19 of the carriage block. The initial form of the spring 37 is such that it tends to turn the lever 30 in the clockwise direction.

It will be seen from FIGURES 1 and 6 that the ends of the pin 27 which extend beyond the outer faces of the links 22 are machined to form bearing surfaces for the arms 32 of the levers 30. Substantially one-half of the cylinder has been removed, so that during normal operation the first detent teeth 33 of the levers 30 firmly engage the ratchets formed by the remaining parts of the ends of the pin 27. FIGURE 1 shows the mechanism when the rear end of the connecting rod and the carriage are normally coupled and are at the end of their backward travel.

In order that the carriage block 17 may perform the same rectilinear movement as the end of the connecting rod 21, a fixed abutment appears to be necessary between the enlarged portion 19 and the links 22, so that the angular position of the latter does not vary during the rapid reciprocating movement of the assembly. In fact, a resilient abutment has been provided in the form of a cylindrical buffer 40 of relatively hard rubber. The latter is introduced into a hole in the enlarged portion 19. It will be seen from FIGURES 1, 3 and 7 that two corners of the enlarged portion 19 are cut away and that in addition two recesses 41 are provided to permit the deformation of the ends of the buffer 40 when they are squeezed by the sides of the links 22, as may be seen from FIGURES 1 and 7.

The means for the automatic coupling and decoupling of the connecting rod 21 and the carriage block 17 will be apparent upon reference to FIGURES 1, 2 and 5. Two symmetrical supports 42 are secured below the forward portion 10A of the base plate by the screws 43. An electromagnetic plunger 44 is secured by four screws 45 to the lower part of the supports 42. Each support 42 comprises a rib 46 (see FIGURE 8) facing towards the interior. In contact with these ribs and guided between the supports 42 is a slide member 47 formed, for example, of a nylon plate. This slide member 47 is connected to the plunger rod 48 by means of a pin 49. The slide member 47 comprises two stop studs 50. The latter have the same spacing as the bearing surfaces 36 of the two levers 30. The studs 50 are so located on the slide member 47 that when the latter is in its lowermost position (FIGURES 1 and 2) these stops 50 are situated below the bearing surfaces 36 of the levers 30, while when the slide member is in the upper position (FIGURE 5), the stops 50 are situated at the same level as the said bearing surfaces 36.

Each of the traction springs 51 has one end engaged with a stud 52 rivetted to the rib 46 on a support 42. The other end of the spring 51 is engaged with the stud 53 rivetted to the slide member 47. Two oblong apertures 54 in the slide member 47 permit vertical displacement of the latter. When the electromagnetic plunger 44 is not energized, the action of the springs 51 raises the slide member 47 into its initial position or upper position, as illustrated in FIGURE 5.

FIGURES 8 and 9 show the means employed to maintain the carriage block 17 stationary in the extreme forward position. A counter-detent 55 comprises a tooth 56 and is secured by a screw 57 in the recess in the lower forward part of the enlarged portion 19 of the carriage plate block 17. A spring blade detent 58 is secured by two screws 59 to the stirrup 60. The stirrup 60 is in turn secured by two screws 61 to the angle lugs of the two supports 42 (see also FIGURE 5). The detent 58 comprises a detent tooth 62. A corrugation 63 is provided in the spring blade of the detent 58, so that the top of this corrugation is substantially in alignment with the centre plane of the slide member 47. Both in FIGURE 9 and in FIGURE 5, the latter is shown in its upper position. The two projections 64 of the slide member 47 are then removed from the corrugation 63 of the detent 58. The detent tooth 62 is substantially at the same level as the counter-detent 55. If the carriage block 17 moves towards the left as seen in the drawing the end of its forward travel, the inclined planes of the detent teeth 56 and 62 come into contact, the detent 58 is lowered and, immediately at the end of the travel of the carriage plate, the detent teeth 56 and 62 remain engaged, whereby the carriage plate is prevented from returning to the rear.

On the other hand, when the slide member 47 is in its lower position, the projections 64 maintain the detent 58 in a lowered position. The detent tooth 62 is then situated (see FIGURE 1) below the level of the detent tooth 56, so that the carriage block 17 cannot be stopped when it reaches the end of its forward travel.

The fragmentary view of FIGURE 3 corresponds to the case where the carriage block is maintained stationary in its extreme forward position. It may be seen that when the bearing surfaces 36 of the levers 30 have abutted, at the end of a forward travel, the studs 50, the levers 30 have turned in the clockwise direction, so that the detent teeth 33 have left the ratchet consisting of the ends of the pin 27 of the connecting rod end. Since the carriage block is maintained stationary, the levers 30 remain in the position illustrated in FIGURE 3, in which the ends of the arm 32 are situated above the path of the pin 27. Since the connecting rod 21 continues to be actuated with its reciprocating movement, the links 22 are driven with an oscillatory movement about the centre of the pin 23, the arcuate trajectory of the pin 27 being shown at 65.

This situation continues as long as the slide member 47 remains in its upper position, i.e. as long as the electromagnetic plunger 44 is not actuated.

Figure 4:
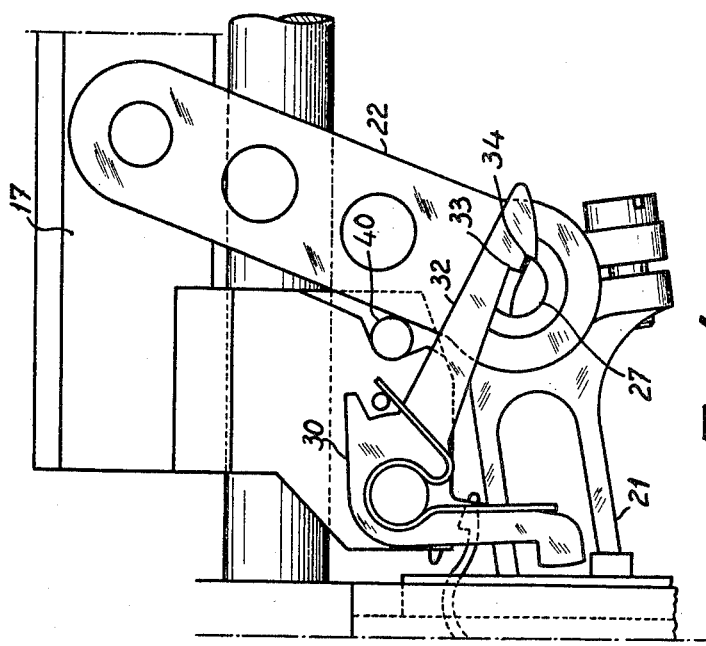
FIGURES 3 and 4 are two fragmentary views of the coupling members with the locking levers in different positions.

The coupling of the carriage 17 to the connecting rod 21 is effected by energisation of the winding of the electromagnetic plunger 44 with a direct current is known manner, preferably at an instant of the cycle of the machine when the connecting rod is situated substantially at the rear dead centre of its travel. Therefore, the slide member 47 is brought into its second position, in which it is downwardly attracted. In the first place, the spring blade detent 58 is pulled downwards, whereby the detent teeth 62 and 56 are disengaged from one another. In the second place, the stop studs 50 are shifted below the bearing surfaces 36 of the levers 30. During the forward oscillatory movement of the pin 27, the latter comes into contact with the inclined portions of the ends of the lever arms 32, and the latter are lifted, whereafter the second detent teeth 34 engage the right-hand edge of the ends of the pin 27. This situation can be seen in FIGURE 4, and corresponds precisely to the instant when the connecting rod 21 is about to commence a further rearward travel.

At this instant, the rubber buffer 40 is slightly compressed by the sides of the links 22. For this purpose, it is sufficient for the carriage block 17 to be connected to the connecting rod 21, so that the carriage block is driven to the rear in a first stroke, the levers 30 remaining in the position illustrated. However, when the rear end of the connecting rod reaches the end of its rearward travel, it stops for an instant. By reason of its kinetic energy the carriage plate tends to continue its rearward travel. Hence, the rubber buffer 40 is then completely compressed by the sides of the links 22. This movement of the carriage plate in relation to the rear end of the connecting rod enables the levers 30 to turn a little more in the clockwise direction, so that the first detent teeth 33 of the levers 30 engage the right-hand edge of the ends of the pin 27. The final coupling of the carriage is then complete.

It will be observed that the second detent teeth 34 have been provided on the lever arms 32 only because no means have been employed to prevent a slight forward displacement of the carriage block 17 when the pin 27 lifts the ends of the lever arms 32 at the time of the coupling. It is clear that if a fixed abutment were provided to prevent the carriage block from travelling beyond its forward dead centre position at this instant, the second detent teeth 4 on the levers would not be required, the detent teeth 33 then being sufficient to ensure the final coupling of the carriage block with the connecting rod.

If it is desired to limit the forces of inertia of the most bulky parts, it is advantageous to machine the connecting rod 21, the links 22 and the carriage block 17 from a light metal, such as an aluminum alloy.

As will have been seen, with the mechanism illustrated in the figures, the stop position of the knife carriage 14 coincides with the forward dead-centre position, i.e. it corresponds to the "throat" side of the card magazine. The mechanism could readily be adapted to make the stop position of the knife carriage coincide with the rear dead-centre position of the reciprocating movement, by utilising the same parts as have been described in the foregoing. For example, it would be sufficient to invert the carriage block 17 and to dispose the supports 42, the electromagnetic valve 44 and the slide member 47 in the region of the rear part 10B of the base plate of the card magazine.

Further modifications are obviously within the scope of the person skilled in the art, depending upon the requirements of the applications envisaged.

I claim:
1. A mechanical coupling arrangement for connecting a driving member having a reciprocating movement to a member to be driven with a reciprocating movement in a direction determined by guide means, said arrangement comprising:
  a carriage block to be driven, having a transverse pin situated at one end,
  two lateral levers arranged to turn on said pin and urged to turn by a wire spring on each side of said block, each of said levers having an arm terminated by a detent tooth and a second, substantially vertical arm terminated by a bearing surface,
  a driving connecting rod,
  a connecting rod pin secured in one coupling end of said connecting rod,
  two links, one on each side of said carriage block, which links are connected together by means of a pin mounted to turn in a centre part of said carriage block, said links having lower portions pivotally connected to the ends of said connecting rod pin which project on either side, these ends being in addition adapted to be normally engaged by the detent teeth of said levers, whereby the carriage block follows the reciprocating movement of said connecting rod, and
  stop abutment means adapted to occupy one of two positions and so positioned that when these means are in a non-actuating position, they are engaged (in contact) with said bearing surfaces of the vertical arms of said levers when said carriage block reaches the end of its travel, said levers then turning against the action of said springs so as to decouple said end of the connecting rod from the carriage block.

2. A mechanical coupling arrangement according to claim 1, where said stop abutment means comprise a plate adapted to slide in supports in a plane perpendicular to the direction of movement of the carriage block, springs for returning said plate into a non-actuating position, an electromagnetic actuating device coupled to said plate to bring it into another position, said plate comprising two stop studs so spaced and disposed as to be situated opposite to and at the same level as the bearing surfaces on said levers when said plate is in its non-actuated position.

3. A mechanical coupling arrangement according to claim 1, wherein said carriage block comprises a buffer recess situated between the pin at its end and said links, there being a buffer of resilient material disposed in said recess and having ends which project in such manner as to be compressed between said recess and one side of the links when the carriage block is normally coupled to said end of the driving connecting rod.

4. A mechanical coupling arrangement according to claim 3, wherein a second detent tooth is provided at the end of the first arm of each of said levers, said second tooth being further from the axis of rotation than said first detent tooth, so that it is said second detent teeth of said levers which engage the projecting ends of said connecting rod pin during the first travel of the carriage block when the latter is again coupled to said driving connecting rod.

5. In a mechanism for feeding record cards one-by-one from a magazine to drive rollers of a machine, which comprises guide means for guiding a card carriage in combination:
  a carriage block adapted to move with a horizontal reciprocating movement and comprising a first pin extending through it at one of its ends,
  two lateral levers arranged to turn on said first pin and urged to turn by a wire spring on either side of said carriage block, each of said levers having a first arm terminated by a detent tooth and a second, substantially vertical arm terminating in a bearing surface,
  a driving connecting rod having at one end a head mounted for uniform circular movement by the driving system of the machine,
  a connecting rod pin secured in the other end of said connecting rod,
  two links, one on each side of the carriage block, which links are connected to one another by a pin arranged to turn in an upper centre part of said carriage block, said links having lower parts which are pivotally connected to the projecting ends on either side of said connecting rod pin, said ends being in addition so shaped as to be normally engaged by the detent teeth of said levers, whereby the carriage block follows the reciprocating movement of said connecting rod, and
  stop abutment means adapted to occupy one of two positions and so located that when these means are in a non-actuating position, they are engaged (in contact) with said bearing surfaces of the vertical arms of said levers when said carriage block reaches the ends of its travel, said levers then turning against the action of said springs so as to decouple said other end of the driving connecting rod from the carriage block.

6. The combination according to claim 5, wherein said stop abutment means comprise a plate adapted to slide in supports in a plane perpendicular to the direction of movement of the carriage block, springs for bringing said plate into a non-actuating position, an electromagnetically actuated device coupled to said plate for bringing it into another position, said plate carrying two spaced stop studs so disposed as to be positioned opposite to and at the same level as the bearing surfaces on said levers when said plate is in the non-actuating position.

7. The combination according to claim 5, wherein said carriage block comprises a buffer recess situated between the pin at its end and said links, there being a buffer of resilient material situated in said recess and having ends which project in such manner as to be compressed between said recess and one side of the links when the carriage block is normally coupled to said end of the driving connecting rod.

8. The combination according to claim 7, wherein a second detent tooth is provided at the end of the first arm of each of said levers, said second tooth being further from the axis of rotation than the aforesaid first detent tooth, so that it is said second detent teeth of said levers which engage the projecting ends of said connecting rod pin during the first travel of the carriage block when the latter is again coupled to said driving connecting rod.

References Cited by the Examiner
UNITED STATES PATENTS 3,134,271   5/1964   Ray _____ 74—593

FRED C. MATTERN, Jr., *Primary Examiner.*

W. S. RATLIFF, Jr., *Assistant Examiner.*